United States Patent
Zhang et al.

(10) Patent No.: US 12,103,167 B2
(45) Date of Patent: Oct. 1, 2024

(54) ROBOT ARM LINK WITH EMBEDDED CABLES AND ROBOT

(71) Applicant: ABB Schweiz AG, Baden (CH)

(72) Inventors: Jiafan Zhang, Shanghai (CN); Hao Gu, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 83 days.

(21) Appl. No.: 17/616,046

(22) PCT Filed: Jul. 17, 2019

(86) PCT No.: PCT/CN2019/096397
§ 371 (c)(1),
(2) Date: Dec. 2, 2021

(87) PCT Pub. No.: WO2021/007821
PCT Pub. Date: Jan. 21, 2021

(65) Prior Publication Data
US 2022/0297319 A1 Sep. 22, 2022

(51) Int. Cl.
*B25J 19/00* (2006.01)
*B25J 9/00* (2006.01)
*B25J 18/00* (2006.01)

(52) U.S. Cl.
CPC ......... *B25J 19/0029* (2013.01); *B25J 9/0009* (2013.01); *B25J 18/00* (2013.01)

(58) Field of Classification Search
CPC .................. B25J 19/0025; B25J 19/0029; B25J 19/0033; B25J 19/0041; H02G 11/00
See application file for complete search history.

(56) References Cited

U.S. PATENT DOCUMENTS

| 4,959,958 A | 10/1990 | Nishikawa et al. |
| 6,170,148 B1 * | 1/2001 | Van Den Berg ..... G01D 11/245 73/660 |

(Continued)

FOREIGN PATENT DOCUMENTS

| CN | 1408514 A | 4/2003 |
| CN | 2756413 Y | 2/2006 |

(Continued)

OTHER PUBLICATIONS

International Search Report and Written Opinion, issued by the ISA/CN National Intellectual Property Administration, regarding corresponding patent application Serial No. PCT/CN2019/096397; dated Apr. 15, 2020; 9 pages.

(Continued)

*Primary Examiner* — Charles A Fox
*Assistant Examiner* — Gregory T Prather
(74) *Attorney, Agent, or Firm* — Greenberg Traurig, LLP

(57) ABSTRACT

Robot arm link (100) comprises a body made of non-metallic material, a transmission cable (102) made of conducive material and embedded within the body (101), and at least one connector (103) arranged on the body (101) and coupled to the transmission cable (102), each connector (103) adapted to be electrically connected to a connector (1031) of a further robot arm link (1001) of a same specification, a sensor (301), or a power source (302) of the robot (200). By embedding the transmission cable (102) within the non-metallic material to form the robot arm link (100), there is no need to consider how to route the cable (102) and thus the difficulty of cable routing design can be significantly reduced. Furthermore, the efficiency of robot assembly and maintenance can be increased accordingly. In addition, the cables (102) arranged in the robot arm links (101) are not (Continued)

easily damaged, thereby increasing the service life of the robot.

11 Claims, 5 Drawing Sheets

(56) References Cited

U.S. PATENT DOCUMENTS

| | | | |
|---|---|---|---|
| 9,586,327 | B2 | 3/2017 | Schena |
| 2003/0062858 | A1 | 4/2003 | Shimizu et al. |
| 2004/0052630 | A1* | 3/2004 | Nihei .................. H05K 9/0098 414/730 |
| 2004/0261563 | A1 | 12/2004 | Toshihiko et al. |
| 2006/0254379 | A1 | 11/2006 | Burchyett |
| 2009/0114052 | A1 | 5/2009 | Kazuhiro et al. |
| 2013/0037306 | A1* | 2/2013 | Kim ................... B29C 66/1122 156/60 |
| 2018/0029239 | A1 | 2/2018 | Fodor et al. |
| 2018/0255667 | A1* | 9/2018 | Kawai .................. H05K 1/185 |
| 2018/0294075 | A1* | 10/2018 | Esmail ................. B29C 48/154 |
| 2020/0392824 | A1* | 12/2020 | Batarseh ................ E21B 29/02 |
| 2021/0038327 | A1* | 2/2021 | Grüner ................... A61B 34/30 |
| 2022/0134580 | A1* | 5/2022 | Kiribuchi .............. B25J 19/007 74/490.02 |

FOREIGN PATENT DOCUMENTS

| | | |
|---|---|---|
| CN | 1836852 A | 9/2006 |
| CN | 101277006 A | 10/2008 |
| CN | 203579680 U | 5/2014 |
| CN | 104040802 A | 9/2014 |
| CN | 107206600 A | 9/2017 |
| CN | 107351074 A | 11/2017 |
| CN | 206717861 U | 12/2017 |
| CN | 208084334 U | 11/2018 |
| CN | 208841407 U | 5/2019 |
| CN | 109834703 A | 6/2019 |
| CN | 101933102 A | 12/2020 |
| EP | 0722811 A1 | 7/1996 |
| JP | 2010137300 A | 6/2010 |
| JP | 5347466 B2 | 11/2013 |
| WO | 2008072446 A1 | 6/2008 |

OTHER PUBLICATIONS

Office Action from corresponding Chinese application No. 201980096996.1 issued Jun. 21, 2023.

* cited by examiner

ROBOT ARM LINK WITH EMBEDDED CABLES AND ROBOT

CROSS-REFERENCE TO RELATED APPLICATIONS

This application is a national stage of International Patent Application Serial No.: PCT/CN2019/096397, filed on Jul. 17, 2019; and which is herein incorporated by reference in its entirety.

FIELD

Embodiments of the present disclosure generally relate to a robot arm link as well as associated robot comprising a plurality of robot arm links.

BACKGROUND

Cables which are usually arranged in arm links of the robot are key components working in industrial robots. Because the arm links of the robot typically rotate around a joint, how to route the cable to prevent the cable from affecting rotation range of the robot arm link and prevent premature failure of the cable is a challenge in robot design. Even for static cables, due to problems such as space occupation, there is still necessary to consider how to reduce the space occupation of the cables when designing a small robot.

Furthermore, it is time-consuming in cable assembly during the industrial robot assembly. Due to the flexibility of the cables, they are prone to deformation from their initial shapes during the assembly, which increases the difficulty of the routing and thus reduces the efficiency of the industrial robot assembly. The operator's experience is usually required to arrange the cable in the arm link. In addition, as some cables would pass through the whole robot from a robot base to its wrist, the robot needs to be almost disassembled and then re-assembled during replacement of the cable, increasing the difficulties in maintenance.

SUMMARY

In order to address or at least partially address the above and other potential problems, embodiments of the present disclosure provide a robot arm link comprising a transmission cable embedded therein and associated robot.

In a first aspect, a robot arm link is provided. The robot arm link comprises a body made of non-metallic material; a transmission cable made of conductive material and embedded within the body; and at least one connector arranged on the body and coupled to the transmission cable, each connector adapted to be electrically connected to a connector of a further robot arm link of a same specification, a sensor, or a power source of the robot.

By embedding the transmission cable within the non-metallic material to form the robot arm link, there is no need to consider how to route the cable and thus the difficulty of cable routing design can be significantly reduced. Furthermore, the efficiency of robot assembly and maintenance can be increased accordingly. In addition, the cables arranged in the robot arm links are not easily damaged, thereby increasing the service life of the robot.

In some embodiments, the transmission cable comprises at least one of the following: a signal transmission cable for transmitting signal of the sensor, or a power transmission cable for transmitting electrical power. With the above arrangement, both the signal and the power can be transmitted from base of a robot to the wrist through the embedded transmission cables, improving the stability of the transmission and even the stability of the robot control.

In some embodiments, the at least one connector comprises a signal sub-conductor coupling to the signal transmission cable; and a power sub-conductor coupling to the power transmission cable, the signal sub-conductor and the power sub-conductor insulated from each other. In this way, other robot arms, sensors or power source or the like can be coupled to the robot arm easily with the signal sub-conductor and/or power sub-conductor, improving the efficiency of robot assembly and maintenance.

In some embodiments, the transmission cable is integrally formed in the body by injection molding the body. As a result, assembly efficiency and structural strength of the robot arm links may be increased significantly.

In some embodiments, the non-metallic material comprises at least one of the following: plastic material, or composite material. In this way, the body of the robot arm link may be made of any suitable insulating material.

In some embodiments, the connector is electrically connected to the connector of the further robot arm link of the same specification through at least one of the following: a moving cable, a pair of contactless inductive coupling components, or a slip ring. As a result, connections between one robot arm links and other robot arm links, sensors or power sources become easier and more stable.

In some embodiments, the transmission cable comprises a conductor or a combination of the conductor and a shield surrounding the conductor. That is, the cable may be a bare conductor or a conductor with a cladding, which further reduces assembly difficulties.

In some embodiments, the connector is integrally formed on a surface of the body by injection molding the body. This further simplifies the connections between one robot arm links and other robot arm links, sensors or power sources.

In second aspect, a robot comprising at least one of the robot arm link as mentioned in the above first aspect is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
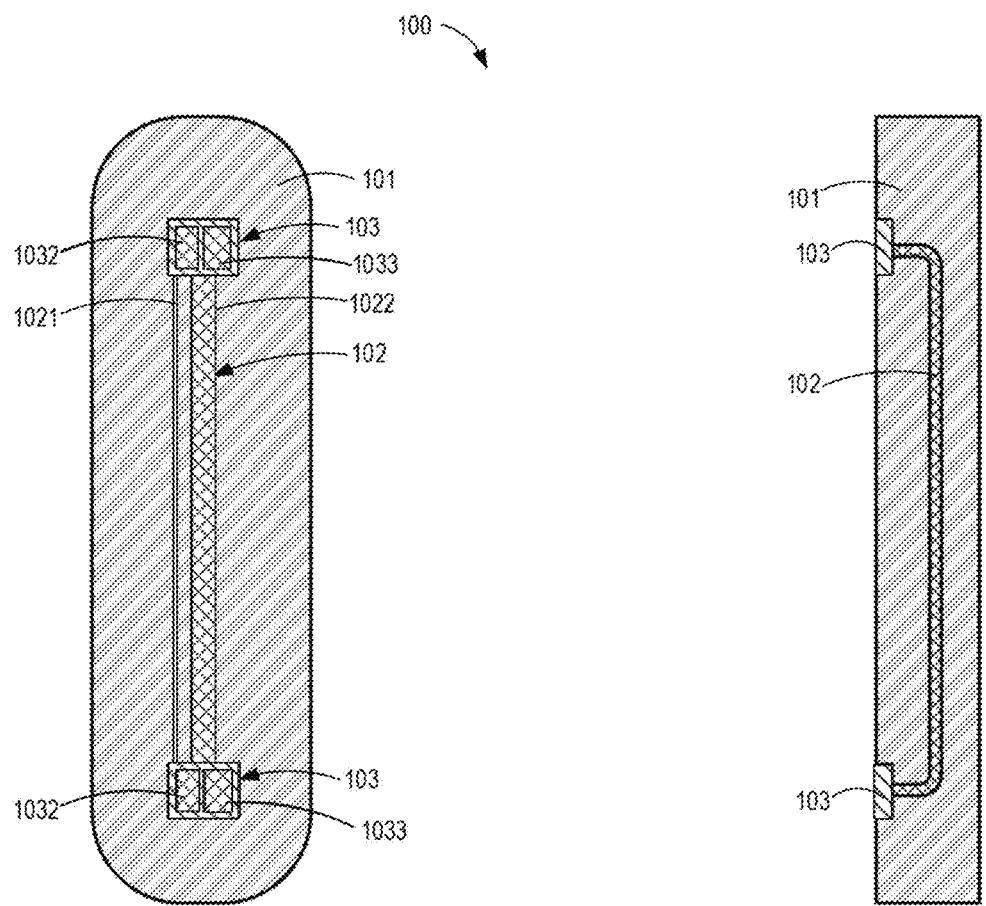
FIG. 1 shows sectional front and side views of a robot arm link according to embodiments of the present disclosure.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Robots are currently used in more and more fields. The development of cheap robots and small and light robots has met various needs of different fields. Under this trend, non-metallic robots, such as plastic robots have been developed. The use of non-metallic material such as plastic material or composite material or the like to make robots is a trend in robot development.

In robots, cables are key components. For the plastic robots, robot arm links of the robots are typically manufactured to be hollow for the cables to be arranged therein. There are various cables arranged in arm links of the robot. They are used to transmit signals of sensor, control signals, power or the like from a base to an end effector of the robot. Because the arm links of the robot will rotate around a joint, how to route the cable in the robot arm link to prevent the cable from affecting rotation range of the robot arm link and prevent premature failure of the cable is a key link in robot design.

In the conventional solution, the robot arm links and the joints need to be specifically designed for the cable routing, which requires consideration of many factors and is thus time-consuming. In addition, how to route cables in the robot arm links during the assembly and maintenance processes of the robots, especially small plastic robots, is also a time-consuming and labor-intensive task.

Specifically, at least due to the flexibility of the cables, they are prone to deformation from their initial shapes to arbitrary shapes during the assembly. The deformation increases the difficulty of the routing and thus reduces the efficiency of the industrial robot production. Furthermore, the operator's experience is usually required to route the cable in the arm link. This reliance on operator's experience reduces the reliability of the cable routing.

In addition, as some cables would pass through the whole robot from the base to its end effector, the robot needs to be almost disassembled and then re-assembled during replacement of the cable, increasing the difficulties in maintenance.

In order to solve or at least partially solve the above problems, embodiments of the present disclosure provide a robot arm link with a transmission cable embedded therein. Now some example embodiments will be described with reference to FIGS. 1-6.

FIG. 1 shows sectional front and side views of a robot arm link according to embodiments of the present disclosure. As shown, generally, the robot arm link 100 comprises a body 101, a transmission cable 102 and at least one connector 103. The body 101 is made of non-metallic material, such as plastic material or composite material or the like. In this way, the robot 200 can be made lighter and can be manufactured in a cheaper manner, which is in line with the trend of the development of the robot field.

The robot arm link 100 herein refers to a main structure of a robot, such as a robot arm, a base, a wrist, or even end-effectors. In addition, the body 101, as the main structure of the robot, may be of any suitable shapes to meet the requirements of the robot. Although FIG. 1 shows that the body 101 is of a plate shape, it is to be understood that this is illustrative, without suggesting any limitations as to the scope of the present disclosure. Any suitable shapes of the body 101 may be possible. For example, in some alternative embodiments, the body 101 may have a free-form surface or bent shapes.

Figure 2:
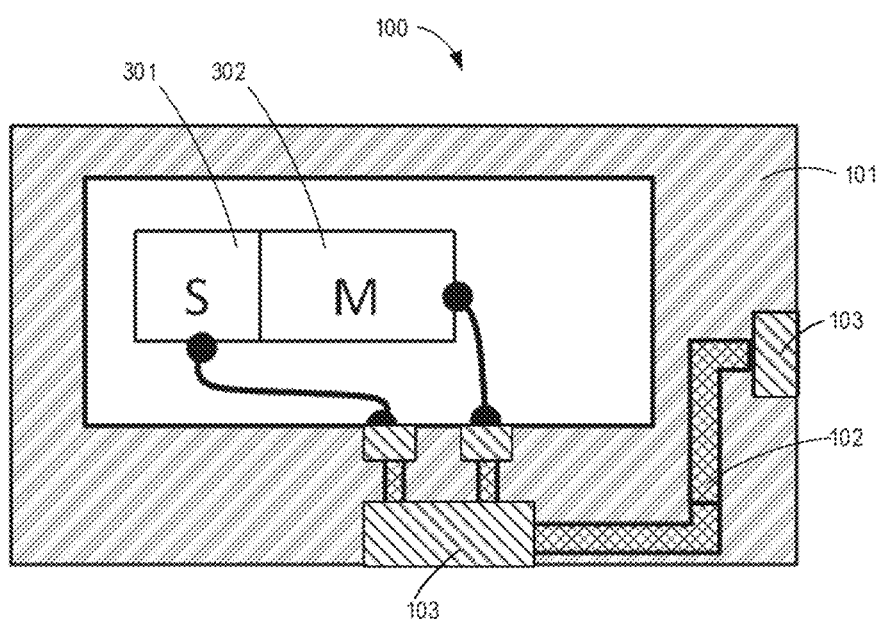
FIG. 2 shows sectional views of a robot arm link according to embodiments of the present disclosure.
Figure 3:
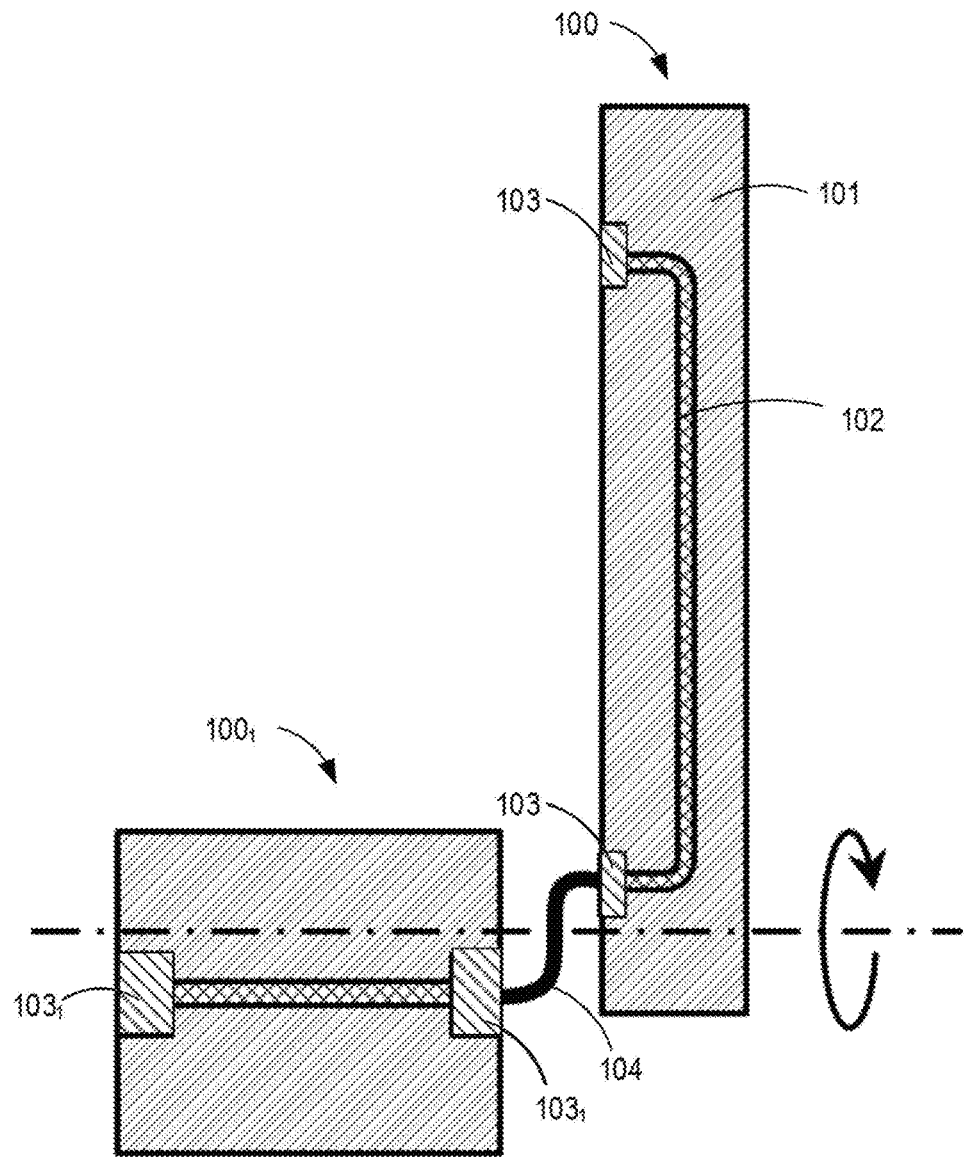
FIG. 3 shows a sectional side view of two robot arm links coupled to each other according to embodiments of the present disclosure.
Figure 4:
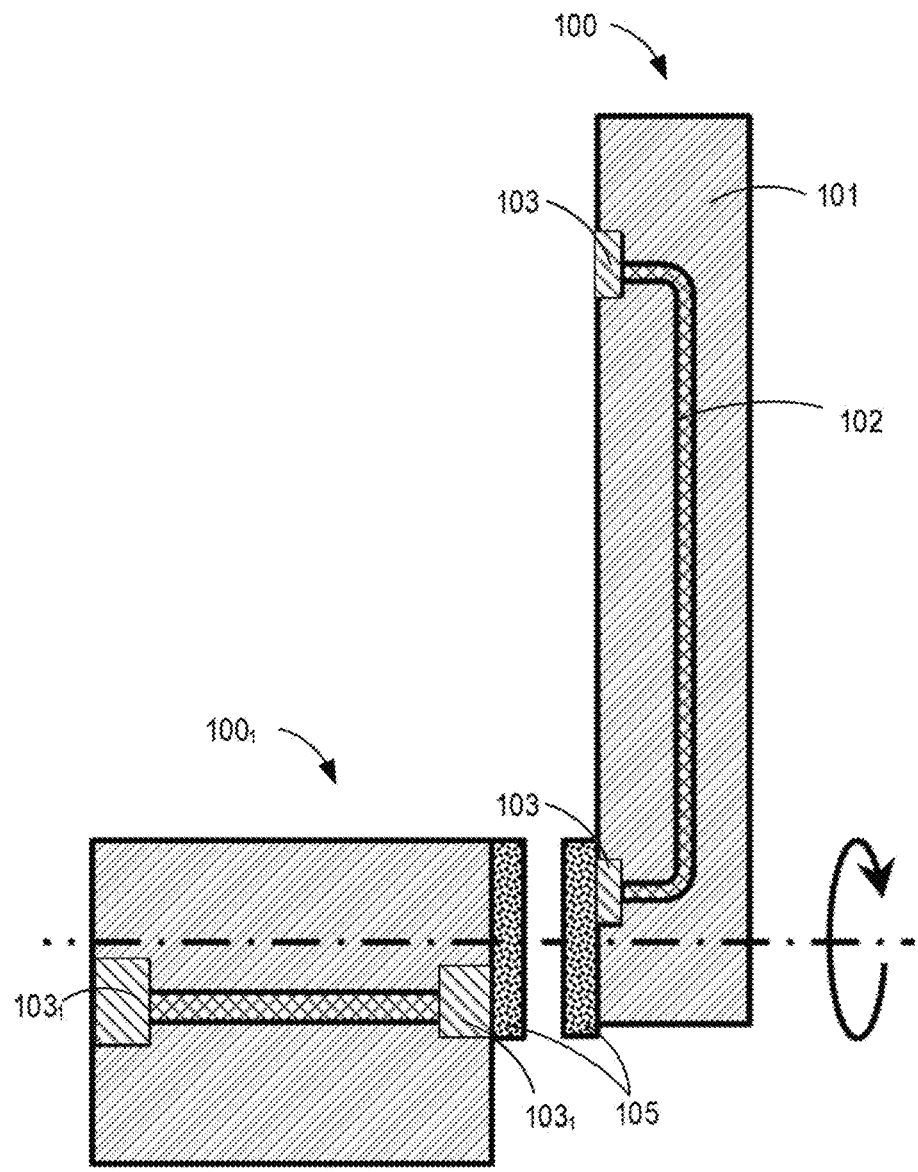
FIG. 4 shows a sectional side view of two robot arm links coupled to each other according to embodiments of the present disclosure.
Figure 5:
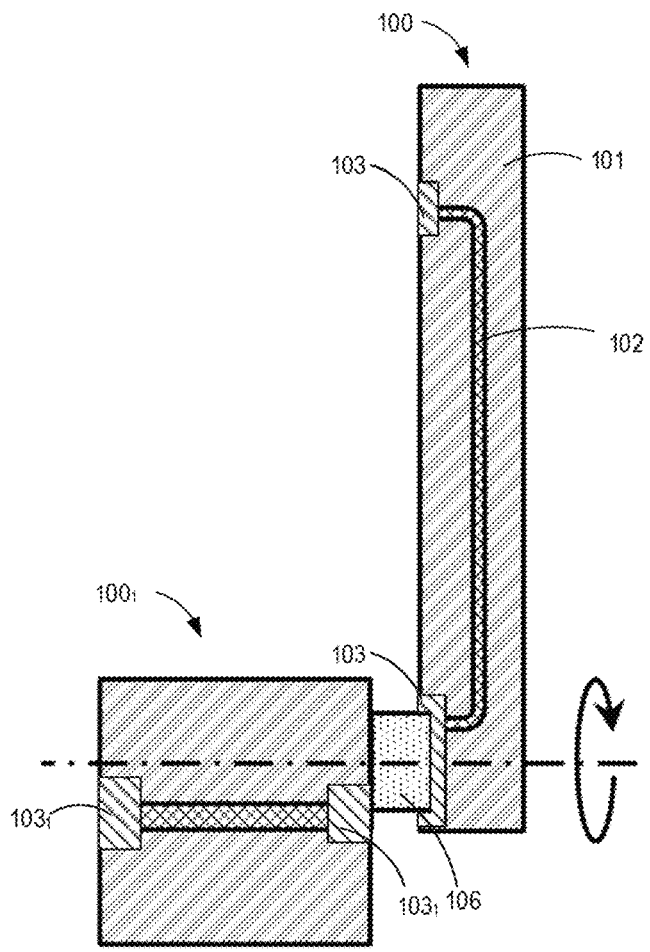
FIG. 5 shows a sectional side view of two robot arm links coupled to each other according to embodiments of the present disclosure.

In contrast to the conventional solutions, the robot arm link 100 herein comprises the transmission cable 102 embedded therein and connector 103 arranged on the body 101 and coupled to the transmission cable 102. The connector 103 can be used to be coupled to a connector $103_1$ of a further robot arm link $100_1$, as shown in FIGS. 3-5. In this way, the signal and/or power can be transmitted from the base to the wrist or even the end effector in a more convenience way. Furthermore, the connector 103 may also be coupled to a sensor 301 or a power source 302 or the like, as shown in FIG. 2.

In this way, the time-consuming design process for the cable routing can be omitted to some extent. Thus, designers merely need to focus on how to couple the connectors 103, $103_1$ of two robot arm links 100, $100_1$ and can pay more attention to more important aspects such as structural or control design of robots. The connector 103 on the body 101 may be arranged to facilitate the coupling between the robot arm link 100 and other robot arm links $100_1$, sensor 301 or a power source 302.

For example, in some embodiments where two robot arm links coupled to each other may coaxially rotate relative to each other, a connector 103 may be arranged on an inner circumference of a recess of one robot arm link 100 and a connector $103_1$ may be arranged on an outer circumference of a cylindrical end of another robot arm link $100_1$. In this way, the two connectors 103, $103_1$ may be coupled to each other by simply inserting the cylindrical end of the robot arm link $100_1$ into the recess of the robot arm link 100.

It can be seen from the above that with the transmission cable 102 embedded in the body 101, no additional cable routing is needed during the assembly of robots, thereby increasing the assembly efficiency of robots. Furthermore, during maintenance of the robot, the robot arm links 100 no longer need to be disassembled or re-assembled to re-route the cable, increasing the maintenance efficiency.

It is to be understood that the above embodiments are just example embodiments that show how the connector 103 on the body 101 may be arranged to facilitate the coupling between the robot arm link 100 and other robot arm links $100_1$. The connector 103 can be arranged on any suitable position on the body 101 of the robot arm link 100. Furthermore, the shape of the connector 103 may also be set to facilitate the coupling the robot arm link 100 and other robot arm links $100_1$, sensor 301 or a power source 302.

For example, in the above mentioned example embodiments, one of the connectors 103, $103_1$ may be bent to protrude from the outer circumference and be resiliently deformed when the cylindrical end of the robot arm link $100_1$ is inserted into the recess. In this way, the coupling performance between the two robot arm links 100, $100_1$ can be improved.

In order to meet the transmission requirements of control signals, power, and the like in the robot in different situations, the transmission cable 102 may comprise various types of cables. For example, in some embodiments, the transmission cable 102 may comprise at least one of a signal transmission cable 1021 for transmitting control signal, such as a signal of the sensor 301 and a power transmission cable 1022 for transmitting electrical power, as shown in FIG. 1.

Figure 6:
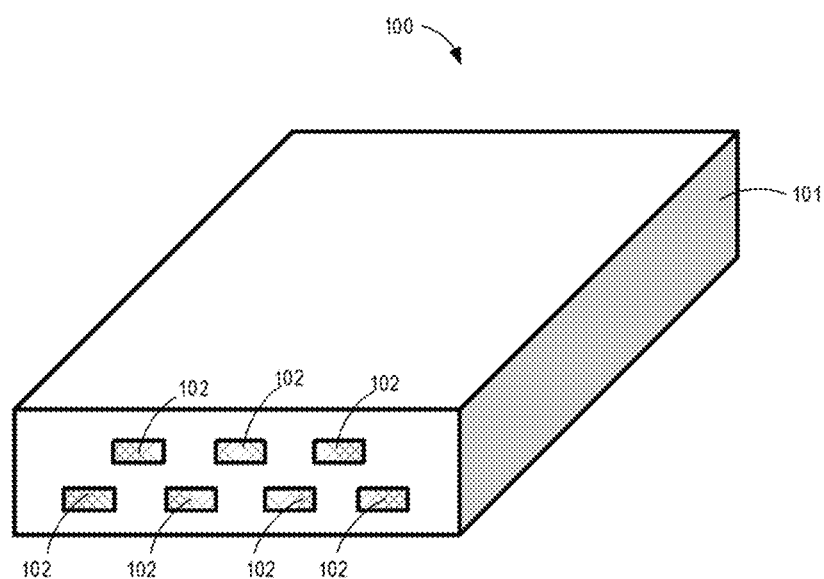
FIG. 6 shows a section view of a robot arm link according to embodiments of the present disclosure.

Furthermore, FIG. 6 shows a section view of a robot arm link according to embodiments of the present disclosure. As shown, several transmission cables 102 are embedded in the body 101 to transmit various signals/power. The distance between any two transmission cables 102 may be designed to meet electrical transmission requirements, to avoid interference between the transmission cables 102 and improve the stability of the transmission.

Similarly, the connectors 103 may also comprise a signal sub-conductor 1032 and a power sub-conductor 1033. The signal sub-conductor 1032 and the power sub-conductor 1033 can be coupled to the signal transmission cable 1021 and the power transmission cable 1022, respectively. The signal sub-conductor 1032 and the power sub-conductor 1033 are insulated from each other.

In this way, the control signal and/or the signal of the sensor 301 can be transmitted between the base and the end effector, and the electrical power can be transmitted from the power source to motors for actuating the end effector, without introducing any additional cables. This improves the stability of the transmission and even the stability of the robot control.

In some embodiments, the signals from the sensor 301 or signals to a control unit of the robot 200 may be transmitted in a wired or wireless manner. That is, in some embodiments, the signal may be transmitted to the control unit through a sensor cable, as shown in FIG. 2. In some alternative embodiments, the signal may also be transmitted wirelessly. In the embodiments where the signal is transmitted wirelessly, the robot arm link 100 may also comprise a wireless receiving module to handle such transmissions.

The robot arm link 100 may be manufactured in any suitable ways to allow the transmission cable 102 and/or the connector 103 to be integrally formed in the body 101. For example, the transmission cable 102 and/or the connector 103 may be integrally formed in the body 101 by injection molding the body 101. Specifically, the transmission cable 102 and/or the connector 103 may be arranged in suitable positions in a mold of the body 101 during the injection molding process of the body 101. In this way, assembly efficiency and structural strength of the robot arm links 100 may be increased significantly.

In addition, in some embodiments, after being injection molded, the body 101 may be properly machined to achieve the desired shape and precision. It should be noted that the arrangement of the transmission cables 102 should prevent the machining from damaging the transmission cables 102.

It should be understood that the body 101 may be formed by injection molded in the above embodiments is merely for illustration, without suggesting any limitations as to the scope of the present disclosure. Any other suitable approaches or methods are possible as well. For example, in some embodiments, the body 101 may also be formed by 3D printing or additive manufacturing technology.

In some embodiments, the transmission cable 102 integrally formed in the body 101 may be a conductor alone or a combination of the conductor and a shield surrounding the conductor. That is, the cable may be a bare conductor or a conductor with a cladding, which further reduces manufacturing difficulties.

In some embodiments where the body 101 is formed by 3D printing or additive manufacturing technology, the transmission cable 102 may also be formed by stacking of conductive materials. This further increases the overall strength of the body 101.

The coupling between one connector 103 of a robot arm link 100 and other connectors $103_1$ of other robot arm links $100_1$ may be achieved in any suitable ways without affecting the relative rotation of the two robot arm links 100, $100_1$. For example, in some embodiments, the two connectors 103, $103_1$ may be connected through a moving cable 104, as shown in FIG. 3. The moving cable 104 may be deformed to accommodate the relative rotation between the two robot arm links 100, $100_1$, so that the two connectors 103, $103_1$ remain connected during the relative rotation between the two robot arm links 100, $100_1$.

It should be understood that using the moving cable 104 to connect the connectors in the above embodiments is merely for illustration, without suggesting any limitations as to the scope of the present disclosure. Any other suitable arrangements are possible as well.

For example, in some alternative embodiments, the two connectors 103, $103_1$ may also be connected through a pair of contactless inductive coupling components 105, as shown in FIG. 4. As shown, two inductive discs are arranged opposite to each other and coaxially on the two connectors 103, $103_1$, respectively. The signal can be transmitted through the pair of contactless inductive coupling components 105 no matter how the two robot arm links 100, $100_1$ rotate relative to each other.

In some further alternative embodiments, as shown in FIG. 5, the two connectors 103, $103_1$ may also be connected through a slip ring 106. The slip ring 106 allows the connectors 103, $103_1$ to remain in contact at all times during the relative rotation between the two robot arm links 100, $100_1$.

It can be seen from the above that by embedding the transmission cable 102 within the non-metallic material to form the robot arm link 100, there is no need to consider how to route the cable and thus the difficulty of cable routing design can be significantly reduced. Furthermore, the efficiency of robot assembly and maintenance can be increased accordingly. In addition, the cables arranged in the robot arm links are not easily damaged, thereby increasing the service life of the robot 200.

Figure 7:
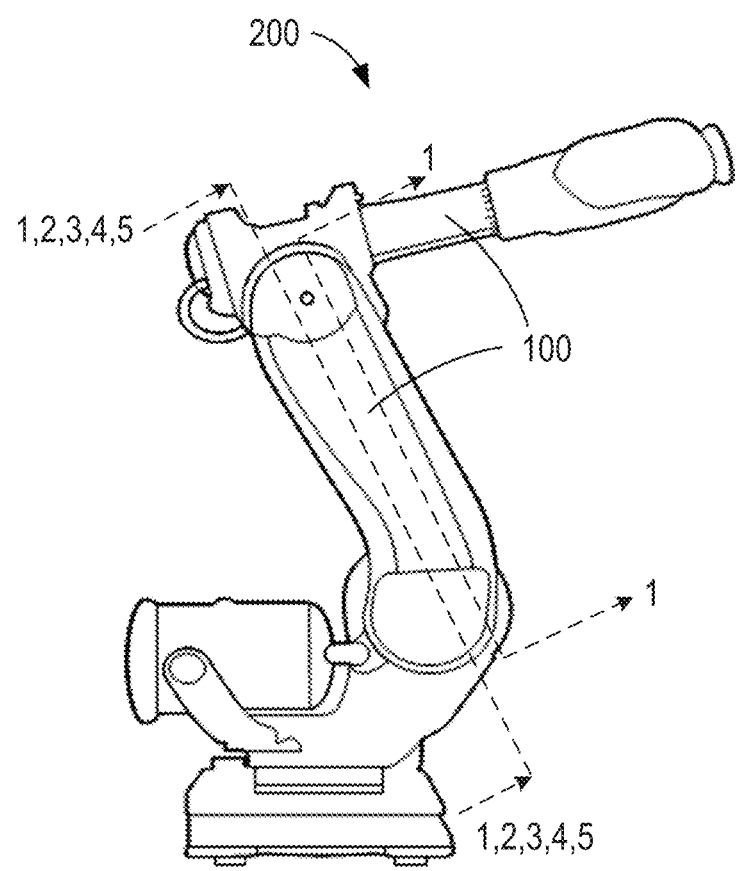
FIG. 7 shows a perspective view of a robot according to embodiments of the present disclosure.

Embodiments of the present disclosure further provide a robot 200, as shown in FIG. 7. The robot 200 comprises a plurality of robot arm links 100 as mentioned above. With the robot arm link 100 as mentioned above, the robot 300 can be efficiently designed, manufactured and maintained.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A robot arm link for a robot, comprising:
a body made of non-metallic material;
the sensor;
a motor;
a first transmission cable in electrical connection with the sensor;
a second transmission cable in electrical connection with the motor;
a third transmission cable comprising:
a signal transmission cable for transmitting signal of a sensor, and
a power transmission cable for transmitting electrical power to the motor; and
at least one connector arranged on the body and coupled to a respective end of the third transmission cable, the at least one connector comprising:
a signal sub-conductor coupled to the signal transmission cable, and
a power sub-conductor coupled to the power transmission cable,
wherein the at least one connector comprising:
a first connector coupled to a first end of the third transmission cable, the first connector being configured to electrically connect the third transmission cable with the sensor and the motor; and
a second connector coupled to a second end of the third transmission cable, the second connector being configured to electrically connect the third transmission cable with a connector of another robot arm link:
wherein the at least one connector is configured to electrically insulate the signal sub-conductor and the power sub-conductor from each other;
wherein each of the first transmission cable, the second transmission cable, and the third transmission cable are made of conductive material and embedded within the body.

2. The robot arm link of claim 1, wherein each of the first transmission cable, the second transmission cable, and the third transmission cable is integrally formed in the body by injection molding the body.

3. The robot arm link of claim 1, wherein the non-metallic material comprises at least one of: plastic material, or composite material.

4. The robot arm link of claim 1, wherein the at least one connector is electrically connected to the connector of the other robot arm link through at least one of: a moving cable, a pair of contactless inductive coupling components, or a slip ring.

5. The robot arm link of claim 1, wherein each of the first transmission cable, the second transmission cable, and the third transmission cable comprises a conductor or a combination of the conductor and a shield surrounding the conductor.

6. The robot arm link of claim 1, wherein the at least one connector is integrally formed on a surface of the body by injection molding the body.

7. The robot arm link of claim 1, wherein the at least one connector is electrically connected to the connector of the other robot arm link through a moving cable.

8. The robot arm link of claim 1, wherein the at least one connector is electrically connected to the connector of the other robot arm link through a pair of contactless inductive coupling components.

9. The robot arm link of claim 1, wherein the at least one connector is electrically connected to the connector of the other robot arm link through a slip ring.

10. A system comprising:
a robot comprising:
a sensor;
a motor; and
at least one robot arm link comprising:
a body made of non-metallic material,
a first transmission cable in electrical connection with the sensor,
a second transmission cable in electrical connection with the motor,
a third transmission cable comprising:
a signal transmission cable, and
a power transmission cable, and at least one connector comprising:
a signal sub-conductor coupled to the signal transmission cable, and
a power sub-conductor coupled to the power transmission cable,
wherein the at least one connector comprising:
a first connector arranged on the body and coupled to a first end of the third transmission cable, the first connector being configured to electrically connect the third transmission cable with the sensor and the motor, and
a second connector arranged on the body and coupled to a second end of the third transmission cable, the second connector being configured to electrically connect the third transmission cable with a connector of another robot arm link;
wherein the at least one connector is configured to electrically insulate the signal sub-conductor and the power sub-conductor from each other;
wherein each of the first transmission cable, the second transmission cable, and the third transmission cable are made of conductive material and embedded within the body.

11. A system comprising:
a robot comprising:
a plurality of robot arm links, at least one robot arm link of the plurality of robot arm links comprising:
a body made of non-metallic material;
a sensor;
a motor;
a first transmission cable in electrical connection with the sensor;
a second transmission cable in electrical connection with the motor;
a third transmission cable
a signal transmission cable for transmitting signal of the sensor, and
a power transmission cable for transmitting electrical power; and
at least one connector
a signal sub-conductor coupled to the signal transmission cable, and
a power sub-conductor coupled to the power transmission cable, and wherein the at least one connector comprising:
 a first connector arranged on the body and coupled to a first end of the third transmission cable, the first connector being configured to electrically connect the third transmission cable with the sensor and the motor, and
 a second connector arranged on the body and coupled to a second end of the third transmission cable, the second connector being configured to electrically connect the third transmission cable with a connector of another robot arm link of the plurality of robot arm links;
 wherein the at least one connector is configured to electrically insulate the signal sub-conductor and the power sub-conductor from each other;
wherein each of the first transmission cable, the second transmission cable, and the third transmission cable are made of conductive material and embedded within the body.

* * * * *